May 5, 1925.
H. C. CARSON
RAKE ATTACHMENT
Filed Feb. 24, 1923
1,537,005
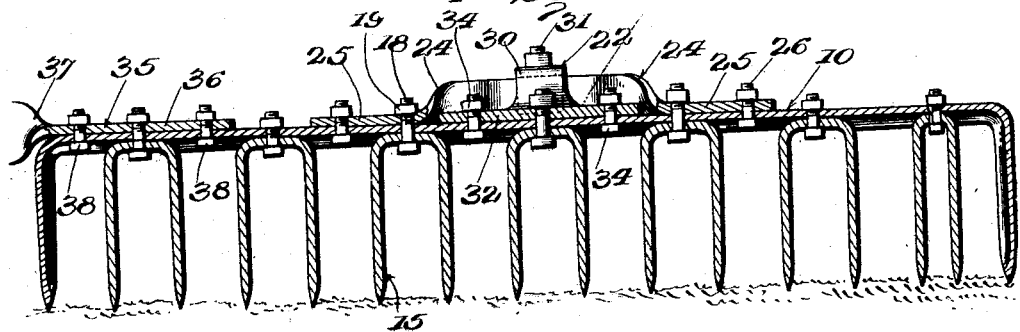
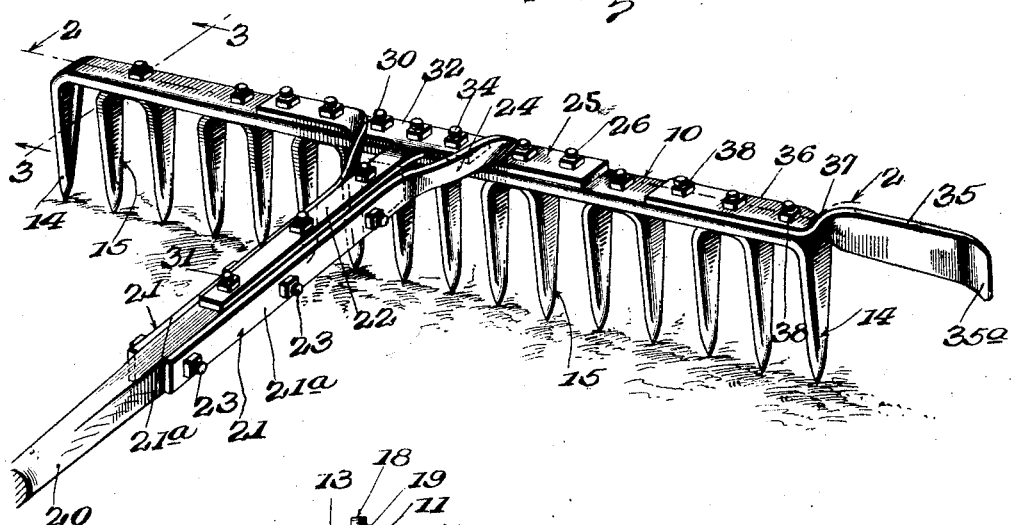
INVENTOR
H.C. Carson
BY
ATTORNEYS
WITNESSES Patented May 5, 1925.

1,537,005

UNITED STATES PATENT OFFICE.

HARRY CLAY CARSON, OF CHEVIOT, OHIO.

RAKE ATTACHMENT.

Application filed February 24, 1923. Serial No. 620,995.

*To all whom it may concern:*

Be it known that I, HARRY C. CARSON, a citizen of the United States, and a resident of Cheviot, in the county of Hamilton and State of Ohio, have invented certain new and useful Improvements in Rake Attachments, of which the following is a specification.

This invention relates in general to an improvement in implements especially adapted for use in gardening or in caring for lawns or the like, and more particularly relates to an implement of this character which may be readily used either as a rake or as a hoe.

The object of the invention is to provide an implement of this character which is equally efficient whether in use as a hoe or as a rake and which may be readily converted from a hoe to a rake by a simple turning movement through an angle of approximately 90°, the implements being well balanced and susceptible of convenient manipulation in either of its capacities.

Another object is to provide improved means for organizing and attaching to the rake head the handle, which is of simple and durable construction and at the same time strong and reliable and not apt to break down in use although capable of being produced without any expensive machining or wood working operation.

A further object is to provide an improved rake head construction which is organized with the other features of the invention to provide a well balanced and efficient though compact and handy implement.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing the preferred embodiment of the invention;

Figure 2 is a view in transverse vertical section taken approximately on line 2—2 of Figure 2; and Figure 3 is a view, taken on line 3—3 of Figure 1.

Referring to the drawings wherein for the sake of illustration is shown the preferred embodiment of the invention the numeral 10 designates a rake head which may be constructed of a single piece of malleable iron formed with a flat top surface 11 and longitudinal side flanges 12 defining a channel 13. The ends of the piece of iron of which the rake head is constructed are bent at right angles to the main portion thereof and these ends are tapered to provide end teeth 14. U-shaped teeth or tines, designated generally at 15, are provided, the body portion of the teeth or tines being designated at 16 and being received in the channel 13 engaging the bottom of the channel and the sides thereof. Each U-shaped tooth which really provides a pair of teeth or tines is held in position by a bolt 18 and a nut 19, the bolt extending upwardly through registering bolt holes provided in the body portion 16 of each U-shaped tooth and the rake head 10 and the nut 19 being threaded on the upper end of the bolt. With this arrangement the head of the bolt designated at 18$^a$ engages the body portion 16 of the tooth 10. In this manner, the teeth are removable for purposes of replacement and repair and yet at the same time they are securely and rigidly held in position.

A handle 20 is provided and is secured to the rake head by means of side straps 21 and a top strap 22. The side straps 21 have portions 21$^a$ which lie flush up against the opposite sides of the handle 20 and are secured to the handle by means of bolts and nuts 23 extending through transverse bolt holes provided therefor in the handle and in the straps 21. As shown in the drawings the portions of the straps 21 which are secured to the handle, extend vertically, and beyond such vertical portions, the straps 21 are twisted, as at 24, in order to provide horizontal attaching plates or portions 25 extending in a plane at right angles to the vertical portions 21$^a$ and disposed to lie flush against the top of the rake head 10. In such position the portions 25 are fastened to the rake head by means of certain of the bolts and nuts 18 and 19 which secure the tines 15 in position and also by other bolts and nuts 26 provided for this purpose. The top strap 22 is preferably in the form of a T and includes a portion 30 bolted to the top of the handle by means of bolts and nuts 31 and a portion 32 secured to the rake head by one of the bolts 18 and 19 and by other bolts 34 provided for the purpose.

At one side of the rake head 10 a hoe blade 35 is provided, the hoe blade extending in the plane of the tines of the rake and being secured to the rake head by means of a shank 36 connected to the blade by a twisted connecting portion 37, the shank being at right angles to the blade. The shank is secured in position flush against the rake head by one of the bolts 34 and also other bolts 38 provided for the purpose. The upper end of the hoe blade 35 may be inturned as at 35ª if desired although obviously this blade may be left straight.

In use the rake head being rigidly and firmly secured to the handle may be readily manipulated. Should it be desired to make use of the implement as a hoe it is only necessary to turn the same through an angle of 90° which will bring the hoe into operative position and dispose the tines of the rake out of the way. The structure provided presents a well balanced and easily manipulated tool which is at the same time of simple and durable construction. The means for connecting the handle to the rake head obviates the necessity of boring the handle and providing a ferrule whereby the full strength of the handle is retained and at the same time provides for a more efficient securing action.

I claim:

A hoe attachment adapted to be attached to a rake head comprising a flat blade having a shank twisted at right angles to the blade to provide an attaching portion, said attaching portion being adapted to be secured to the rake head to dispose the blade in the plane of the teeth of the rake head so that the hoe attachment projects beyond the rake head laterally of the line of draft whereby it is adapted to be brought into use when the rake head is rotated 90°.

HARRY CLAY CARSON.